Sept. 15, 1925.
C. LA CAVERA
ATTACHMENT FOR COOKING UTENSILS
Filed March 28, 1924
1,554,103
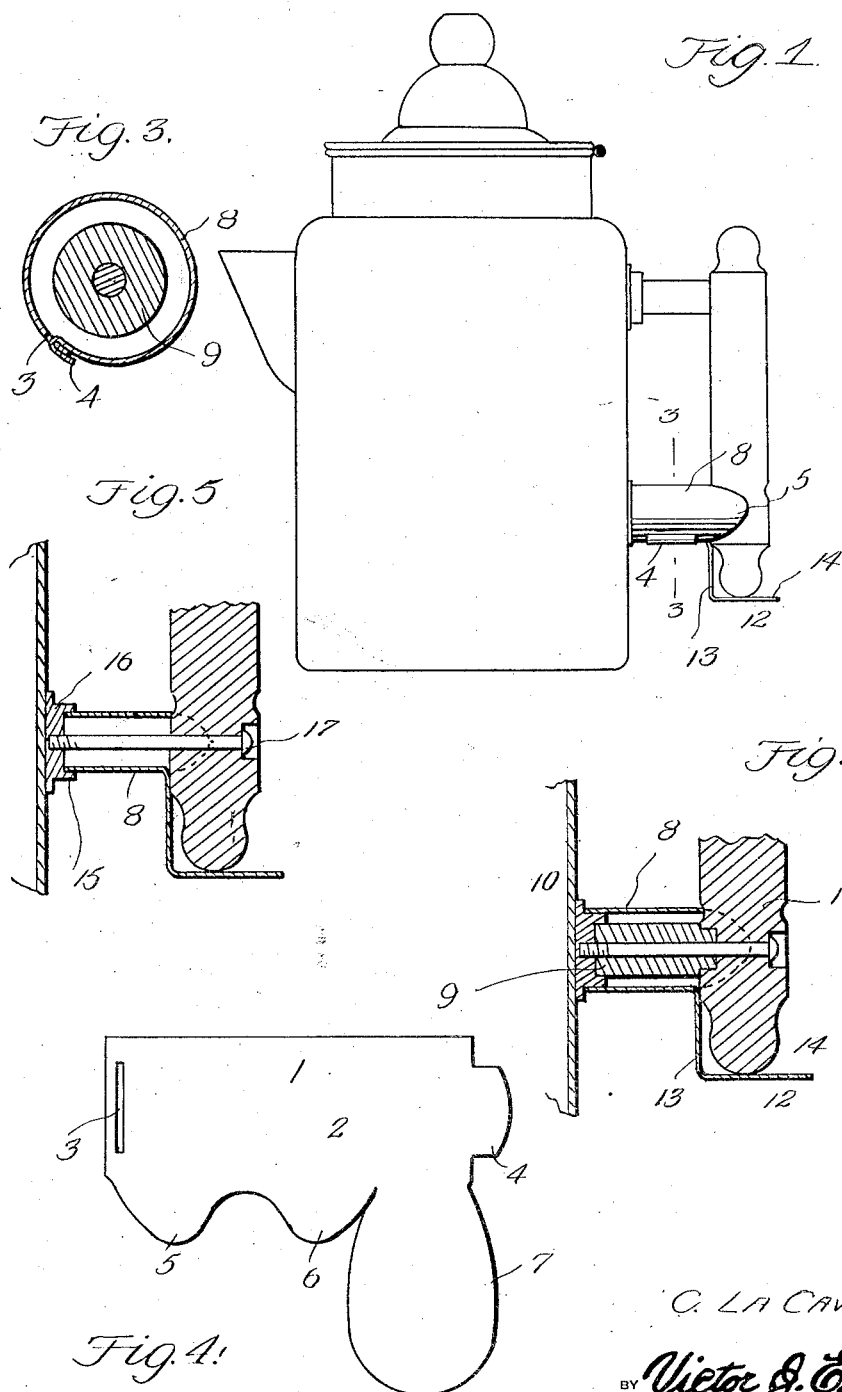
C. LA CAVERA
INVENTOR
BY Victor J. Evans
ATTORNEY
WITNESS: Joseph Lombardo Patented Sept. 15, 1925.

1,554,103

UNITED STATES PATENT OFFICE.

CHARLES LA CAVERA, OF CHICAGO, ILLINOIS.

ATTACHMENT FOR COOKING UTENSILS.

Application filed March 28, 1924. Serial No. 702,637.

*To all whom it may concern:*

Be it known that I, CHARLES LA CAVERA, a citizen of the United States, residing at Chicago, in the county of Cook and State of Illinois, have invented new and useful Improvements in Attachments for Cooking Utensils, of which the following is a specification.

This invention relates to an attachment for cooking utensils and more particularly to an attachment for coffee and tea pots whereby the handle is protected from heat and also more rigidly connected directly to the pot.

An object of the invention is the construction of an inexpensive attachment which may be stamped from a single sheet of material and readily attached in place.

Besides the above my invention is distinguished in an attachment that when once attached it will not accidentally become dislocated.

With these and other objects in view the invention will be better understood from the following detailed description taken in connection with the accompanying drawing wherein:

Fig. 1 is a side elevation of a commercially known type of coffee pot showing my attachment in place.

Fig. 2 is a vertical sectional view.

Fig. 3 is a sectional view on the line 3—3 of Fig. 1.

Fig. 4 is a plan view of the blank.

Fig. 5 is a sectional view of a modification.

Again referring to the drawing illustrating two of the many constructions of my invention and more particularly to Figures 1 to 4 inclusive it will be seen that the attachment comprises a blank 1 stamped from metal to have a body portion 2, a slot 3 at one end of the body portion, and a lug 4 at the other end of the body for insertion through the slot. Tongues 5 and 6 extend from one edge of the body and from this same edge also extends an extension 7. By referring to Figures 1, 2 and 3 it will be noted that the body 2 is formed into a barrel 8 for encircling the connector 9 arranged between the receptacle 10 and handle 11. The lug 4 inserted through the slot 3 holds the body in place with the tongues 5 and 6 engaging the opposite sides of the handle as clearly shown in Fig. 1. The extension 7 is bent to form an L shaped shield 12 the vertical section 13 of which extends up along the back of the handle while the horizontal section 14 engages the under end of the handle to protect same from the heat of the flame.

In Fig. 5 I have shown a barrel 8 forming a direct connection between the handle and receptacle with one end seated in the recess 15 of the collar 16 so that when the bolt 17 is arranged in place all parts will be rigidly connected together.

It is, of course, to be understood the blank may be given various other shapes than illustrated and connected to the handle and receptacle in other manners; therefore, I do not desire to be limited in any manner except as set forth in the claims hereunto appended.

Having thus described my invention what I claim is:

1. A handle protecting attachment for cooking utensils comprising a blank stamped from a single sheet of material to have a body portion, a slot at one end of the body portion, a lug at the other end of the body portion for insertion into the slot, tongues extending from one edge of the body, and an extension also extending from the said mentioned edge of the body.

2. In combination with a receptacle, a handle and a connector between the handle and receptacle, of an attachment comprising a barrel detachably engaged around the connector, tongues extending from the barrel upon opposite sides of the handle and engaged therewith and an angular shield extending from the barrel at a point between the tongues with one arm lying under the handle.

In testimony whereof I affix my signature.

CHARLES LA CAVERA.